W. V. TURNER.
SAFETY DEVICE FOR REGENERATIVE BRAKES.
APPLICATION FILED MAR. 31, 1916.
1,400,839. Patented Dec. 20, 1921.
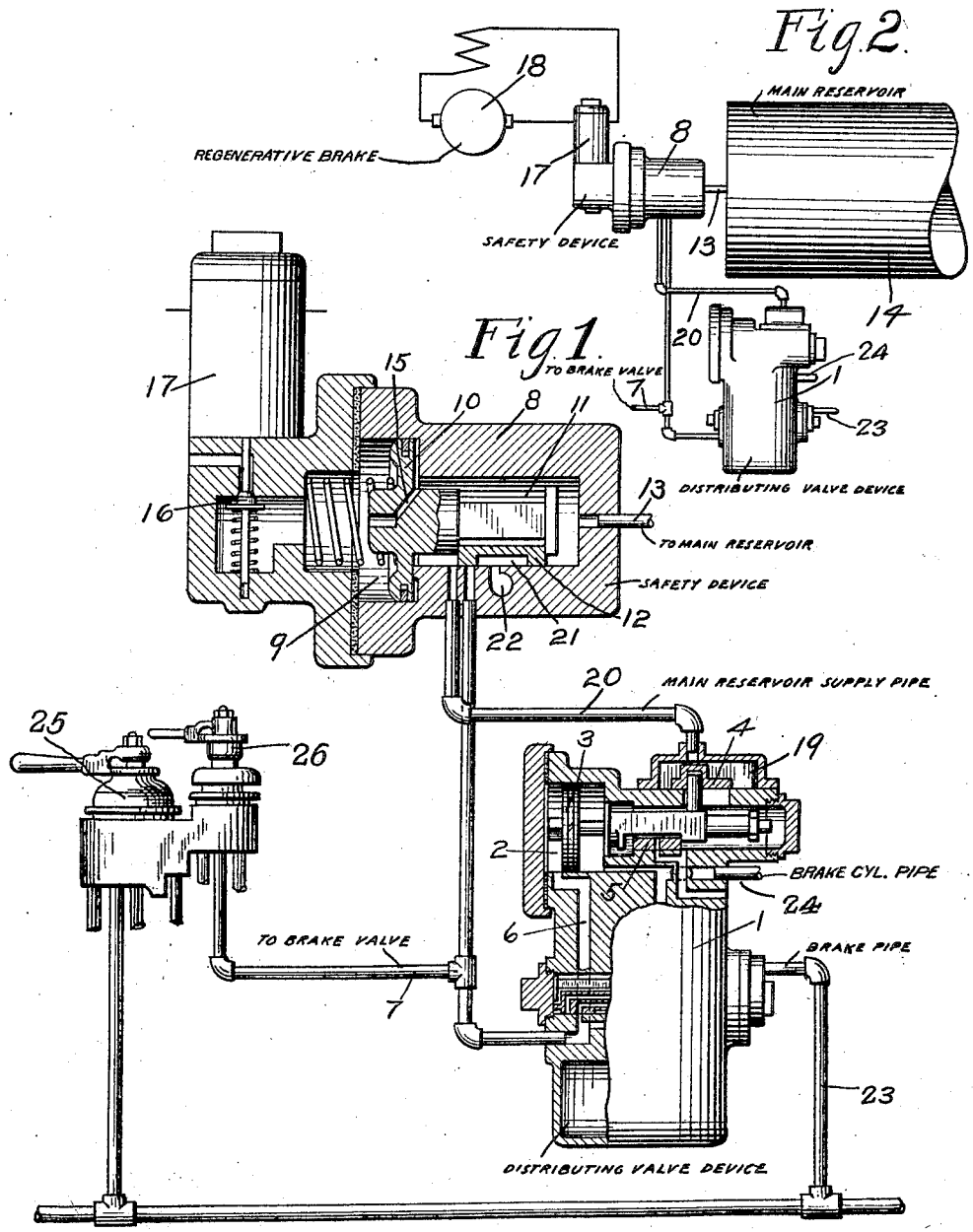

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY DEVICE FOR REGENERATIVE BRAKES.

1,400,839.   Specification of Letters Patent.   Patented Dec. 20, 1921.

Application filed March 31, 1916. Serial No. 87,885.

*To all whom it may concern:*

Be it known that I, WALTER V. TURNER, a citizen of the United States, residing at Wilkinsburg, in the county of Allegheny and State of Pennsylvania, have invented new and useful Improvements in Safety Devices for Regenerative Brakes, of which the following is a specification.

This invention relates to regenerative braking systems, and more particularly to a safety device controlled by the regenerative brake and employed in connection with the fluid pressure brakes.

When a regenerative brake is applied to a locomotive or similar vehicle, it is not desirable to have the usual fluid pressure brakes applied, concurrently with the regenerative brake, since this may produce excessive braking power and may result in wheel sliding.

While the operator can avoid this by applying the brakes on the train, only when the regenerative brake is acting on the locomotive, he is liable at times to inadvertently effect an application of the brakes on the locomotive and thus cause wheel sliding, with the attendant possibility that the control of the train may be lost.

The principal object of my invention is to provide means controlled by the regenerative brake for cutting the locomotive brake out of action when the regenerative brake is in action.

In the accompanying drawing; Figure 1 is a view, partly in section, of a portion of a locomotive brake apparatus, showing my invention applied thereto; and Fig. 2 a diagrammatic view of the apparatus shown in Fig. 1, and connected to a motor-generator circuit.

In order to illustrate one application of my invention, the safety device is shown in the drawing in connection with the distributing valve device of the well known E. T. locomotive brake equipment such as disclosed in the patents of Walter V. Turner, No. 1,039,221, September 24, 1912, and No. 1,109,715, September 8, 1914.

The distributing valve device comprises a casing 1 having an application cylinder 2 containing a piston 3 for operating a valve 4 adapted to control the admission of fluid under pressure to the brake cylinder and a valve 5 for controlling the release of fluid from the brake cylinder.

The application cylinder 2 has a passage 6 communicating therewith and this passage is connected to a pipe 7 leading to the usual independent brake valve device.

The brake pipe 23 is connected to the usual automatic brake valve device 25, the pipe 7 to the independent brake valve device 26, and the pipe 24 is connected to the brake cylinder (not shown).

The above mentioned E. T. locomotive brake apparatus operates in the usual and well known manner to control the automatic and independent application of the brakes as fully described in the hereinbefore mentioned Turner patents.

According to my invention, a safety device is provided comprising a casing 8 having a piston chamber 9 containing a piston 10 and a valve chamber 11 containing a slide valve 12.

The slide valve chamber 11 is connected by a pipe 13 to main reservoir 14 and a port 15 through piston 10 permits equalization of fluid pressure from the valve chamber 11 into the piston chamber 9.

A vent valve 16 controlled by a magnet 17 is provided for venting fluid from piston chamber 9, the magnet 17 being connected to a circuit of an electric or regenerative braking system which is energized when the regenerative brake is acting, but since a regenerative braking system is very complex and includes many parts, and since it is deemed unnecessary to a full and complete understanding of the present invention to illustrate such a system, the regenerative braking system is merely represented in the drawing as a conventional symbol indicated by the reference numeral 18. For a further description of regenerative braking systems, reference is made to the various prior patents showing such systems, as for example, Patent No. 1,245,398 of N. W. Storer, dated November 6, 1917, and Patent No. 1,245,523 of N. W. Storer, dated November 6, 1917.

A preferred way of preventing an application of the brakes on the locomotive is shown in the drawing; which consists in controlling the supply of fluid under pressure from the main reservoir to the supply valve chamber 19 of the distributing valve device, and accordingly pipe 20, which supplies fluid to said valve chamber, is normally connected to the main reservoir 14 through the valve chamber 11 of the safety device, so that when the regenerative brake is not acting, the fluid pressure brakes on the locomotive may be applied and released at will in the usual manner.

When, however, the regenerative brake is acting, as shown in Fig. 2 of the drawing, the magnet 17 will be energized by regenerative braking current and the vent valve 16 will be forced from its seat so as to vent fluid from piston chamber 9. Since fluid is vented from said chamber at a much higher rate than fluid can equalize from valve chamber 11 through port 15 into piston chamber 9, the piston 10 will be shifted outwardly, causing slide valve 12 to connect pipe 20, through a cavity 21 with an exhaust port 22.

It will now be evident that since there is no fluid supply in valve chamber 19, the brakes on the locomotive will not be applied even if the brake valve should be manipulated so as to shift the application piston 3 to application position.

It is possible that the locomotive brakes may have been applied prior to the throwing of the regenerative brake into action, and in order to insure the automatic release of the locomotive brakes in such cases, the pipe 7 may also be connected to the seat of slide valve 12, so that when the slide valve is shifted outwardly, said pipe will be connected through cavity 21 with exhaust port 22 and any fluid in the application cylinder 2 will be exhausted, thus causing the release of the brakes on the locomotive.

Having now described my invention, what I claim as new and desire to secure by Letters Patent, is:

1. The combination with a regenerative brake and a normally operative fluid pressure brake, of means for automatically preventing a fluid pressure brake application when the regenerative brake is acting.

2. The combination with a regenerative brake and a normally operative fluid pressure brake, of means operated when the regenerative brake acts for preventing the operation of the fluid pressure brakes.

3. The combination with a regenerative brake and a fluid pressure brake adapted to be normally operated, of electrically controlled means operated by current from the regenerative brake for preventing an application of the fluid pressure brakes.

4. The combination with a regenerative brake, a source of fluid under pressure, and a valve device for supplying fluid from said source to effect an application of the brakes, of means adapted upon operation of the regenerative brake, to cut off the source of fluid pressure supply from said valve device.

5. The combination with a regenerative brake, a source of fluid under pressure, and a valve device for supplying fluid from said source to effect an application of the brakes on the locomotive, of means operated by current from the regenerative braking circuit for cutting off the source of fluid pressure from said valve device.

6. The combination with a regenerative brake, a source of fluid under pressure, and a valve device having an application cylinder containing a piston operated by fluid in the application chamber for supplying fluid from said source to effect an application of the brakes, of means operative when the regenerative brake is in action for venting fluid from said application chamber.

7. The combination with a regenerative brake, a source of fluid under pressure, and a valve device having an application cylinder containing a piston operated by fluid in the application chamber for supplying fluid from said source to effect an application of the brakes, of means operative when the regenerative brake is in action for venting fluid from said application chamber and for cutting off the source of supply from said valve device.

8. The combination with a regenerative brake, a main reservoir, and a distributing valve device for supplying fluid from the main reservoir for effecting an application of the brakes, of an electrically controlled valve device normally connecting the main reservoir to said distributing valve device and operated when the regenerative brake is in action for cutting off communication from the main reservoir.

9. The combination with separately operable air and electric braking systems for an electric locomotive or the like, of means for controlling the service application of the air brakes from the electric braking system.

10. The combination with means for applying air brakes to a railway train unit and means for applying electric generative braking to the same unit, the two said braking means being each normally separately operable, of means restraining the simultaneous application of the electric braking and the service application of the air brakes.

11. The combination with an air brake system and an electric braking system for an electric locomotive or the like, of means whereby applying the electric brake releases the air brakes.

12. The combination with an electric locomotive or the like, having an air brake system and electric driving motors adapted to operate as generators for electric braking, of means connecting the two braking systems whereby causing the driving motors to operate as generators automatically releases the air brakes.

13. The combination with means for braking an electric locomotive or the like, comprising an air brake system and an electric braking system in which the locomotive driving motors operate as generators, of electromagnetically controlled valve mechanism for releasing the air brakes when the driving motors are caused to operate as generators.

14. The combination with separately operable air and electric braking systems for an electric locomotive or the like, the air brake system having means for making independent and automatic service applications, of means for governing the independent and automatic service application of the air brakes on the locomotive from the electric braking system.

15. The combination with separately operable air and electric braking systems for an electric locomotive or the like, the air brake system having means for making independent and automatic service applications, of means connecting the two braking systems rendering the independent and automatic service application of the air brakes on the locomotive dependent upon the electric braking system.

16. The combination with an air and an electric braking system for an electric locomotive and the cars drawn thereby, of means operated responsively to the application of the electric brake for releasing the service application of the air brakes on the locomotive without affecting the application of the air brakes on the cars.

17. The combination with a regenerative brake and a fluid pressure brake, of means controlled by the regenerative brake for controlling communication through which fluid is supplied to the brake cylinder.

18. The combination with an electric braking system for an electric locomotive or the like and an air brake system for the same having engineer's valve mechanism, of means whereby applying the electric brake renders the engineer's valve mechanism ineffective to make a service application of the air brakes and releasing the electric brake restores full control of the air brakes to the engineer's valve mechanism.

In testimony whereof I have hereunto set my hand.

WALTER V. TURNER.